United States Patent [19]

Watts

[11] Patent Number: 4,474,633

[45] Date of Patent: Oct. 2, 1984

[54] METHOD OF MANUFACTURING RADIAL TIRES

[75] Inventor: George T. Watts, North Canton, Ohio

[73] Assignee: The Goodyear Tire & Rubber Company, Akron, Ohio

[21] Appl. No.: 384,811

[22] Filed: Jun. 3, 1982

[51] Int. Cl.³ .................. B29H 51/16; B29H 17/26
[52] U.S. Cl. ............................. 156/111; 156/126; 156/130.3; 156/396; 156/406.2; 156/416; 152/361 DM; 425/31; 425/33
[58] Field of Search ............... 156/110.1, 123, 124, 156/126–127, 128.1, 130, 130.3, 130.5, 130.7, 396, 406.2, 416; 152/361 R, 361 DM, 361 FP; 425/31–33

[56] References Cited

U.S. PATENT DOCUMENTS

| | | | |
|---|---|---|---|
| 2,884,044 | 4/1959 | Hulswit et al. | 152/359 |
| 2,985,214 | 5/1961 | Lugli | 152/176 |
| 3,093,181 | 6/1963 | Beckadolph | 152/361 |
| 3,218,209 | 11/1965 | Travers et al. | 156/123 |
| 3,224,482 | 12/1965 | Barassi et al. | 152/176 |
| 3,464,873 | 9/1969 | Hawkinson | 156/96 |
| 3,667,529 | 6/1972 | Mirtain | 152/361 |
| 3,677,319 | 7/1972 | Mirtain | 152/361 DM |
| 3,900,062 | 8/1975 | Neville et al. | 152/361 FP |
| 3,909,337 | 9/1975 | Yabe | 425/31 |
| 3,950,201 | 4/1976 | McEvoy et al. | 156/126 |
| 3,960,628 | 6/1976 | Snyder | 156/123 R |
| 3,999,585 | 12/1976 | Grawey | 152/361 R |
| 4,092,196 | 5/1978 | Miller et al. | 156/96 |
| 4,135,566 | 1/1979 | Senger et al. | 152/361 FP |
| 4,147,482 | 4/1979 | Olsen et al. | 425/46 |
| 4,169,877 | 10/1979 | Olsen et al. | 264/315 |
| 4,183,389 | 1/1980 | Grosch | 152/361 PP |
| 4,201,260 | 5/1980 | Mirtain et al. | 152/361 DM |
| 4,202,394 | 5/1980 | Van der Burg | 152/361 R |
| 4,218,277 | 8/1980 | Van der Burg | 156/96 |
| 4,269,646 | 5/1981 | Miller et al. | 156/130 |
| 4,269,649 | 5/1981 | Vanderzee | 156/416 |
| 4,271,889 | 6/1981 | Pommier | 152/353 R |
| 4,271,890 | 6/1981 | Pommier | 152/352 R |
| 4,271,891 | 6/1981 | Pommier | 152/352 R |
| 4,274,464 | 6/1981 | Pommier | 152/352 R |
| 4,288,265 | 9/1981 | Pacciarini et al. | 156/126 |
| 4,304,618 | 12/1981 | Abbot | 156/123 R |

FOREIGN PATENT DOCUMENTS 2734587 2/1979 Fed. Rep. of Germany .
3102614 12/1981 Fed. Rep. of Germany .
2072593 10/1981 United Kingdom .

Primary Examiner—Lois E. Boland
Attorney, Agent, or Firm—L. Drayer

[57] ABSTRACT

There is disclosed herein a method of manufacturing low aspect radial tires. The radial tires are mounted upon a bladder assembly during the time from the assembly of the tread reinforcing structure with the carcass until the vulcanization of the tire in a mold. Restrictor band material is wrapped around the tire to prevent circumferential growth of the tire beyond a predetermined diameter, so that the tire will not become too large to fit into the mold.

1 Claim, 3 Drawing Figures

METHOD OF MANUFACTURING RADIAL TIRES

BACKGROUND OF THE INVENTION

The present invention is concerned with a method of manufacturing low aspect ratio radial tires.

For purposes of describing and claiming the present invention, "aspect ratio" shall mean the ratio of the section height of a tire to the section width of the same tire. The section height of a tire is equal to (overall tire diameter—nominal rim diameter)÷2. The section width of a tire is its axial width at the widest part of the tire. Furthermore, for purposes of describing and claiming the present invention, a "low aspect ratio" shall mean an aspect ratio in the range of about 0.40 to about 0.70.

It is well known by those skilled in the tire design and manufacturing technologies that if the beads of an unvulcanized radial ply tire carcass, that has not been assembled with any tread reinforcing structure, are locked into position, as when mounted upon a rim, and a pressure exerting fluid is introduced into the inflation chamber thus formed, the radial ply carcass will tend to assume an equilibrium profile commonly referred to in the tire art as its natural shape profile or equilibrium profile. A radial section of a radial tire carcass that has expanded to assume its natural shape profile has a pronounced curvature in the portion of the carcass that normally underlies the tread portion of a tire that has been completely assembled. As used herein, "axial" and "axially" refer to the axis of rotation of a tire, and "radial" and "radially" refer to planes in which the axis of rotation of the tire lie. As used herein, "radial ply tire carcass" and "radial tire carcass" refer to any assembly of radial tire structural components, such as plies, beads, tread reinforcement structures, etc., that does not include a "tread", "tread portion" or "ground-engaging tread". However, once a "radial ply tire carcass", "radial tire carcass", or "carcass" has been assembled with or provided with a "tread", "tread material", "tread portion" or "ground-engaging tread", it will be referred to herein as a "radial tire", "completed radial tire", "radial ply tire", or simply as a "tire".

It is a common practice in the tire design and manufacturing technologies to have a radial ply tire carcass provided with a tread reinforcing structure to restrict the expansion of the carcass, and the completed radial tire, in the radial direction. Large radial tires in the size range of about 18.00-25 to about 36.00-51, often referred to as "earthmover tires" because of the large vehicles that they are designed to be mounted upon, may be maintained in the unvulcanized state mounted upon bladder assemblies having a minimal inflation pressure in the range of about 3 to 15 pounds per square inch (p.s.i.), (20,670 to 103,350 Pascales). Although the tread reinforcing structure restricts the diameter of an unvulcanized radial tire, even a minimal inflation pressure may cause the radial tire to expand to a larger than desired diameter during the time between the installation of the tread reinforcing structure around the radial carcass plies and the placing of the radial tire into a mold for vulcanization. The molds in which radial tires are vulcanized have metal tread rings with a fixed inside diameter, which determines the outside diameter of the ground-engaging portion of the tread of a completed radial tire. If the outside diameter of an unvulcanized radial tire has become too large, it will not fit into the mold for vulcanization. It should be noted that this problem could be encountered even in the manufacturing of small passenger car tires and similar articles, and that the method of manufacturing described and claimed herein is not restricted to the manufacture of radial ply earthmover tires.

The present invention is concerned with the use of a restrictor band, having restricting elements which are substantially parallel to each other, and form a substantially zero-degree orientation relative to the mid-circumferential plane of a radial tire or radial tire carcass. As used herein the "mid-circumferential plane" of a radial tire, or a radial tire carcass, shall mean a plane that is perpendicular to the tire or carcass' axis of rotation and located midway between the axial extent of a carcass reinforcing cord of the tire, or carcass, at its greatest axial width. The restrictor band restricts, but does not totally prevent, expansion of an unvulcanized radial tire carcass, or radial tire beyond a predetermined outside diameter at its mid-circumfential plane. The predetermined outside diameter is less than, or equal to, the inside diameter of the tread ring of a mold in which the tire is to be vulcanized.

While the use of zero-degree overlays in passenger car tires to improve high speed performance is known in the tire design and manufacturing technologies, it is believed that the use of restrictor band material to restrict the growth of an unvulcanized radial ply carcass or radial ply tire during the manufacturing process, such as to enable the manufacturing of low aspect ratio earthmover tires was heretofore unknown in the tire art.

There is provided in accordance with one aspect of the present invention a method of manufacturing a radial tire comprising the steps of: (a) providing an unvulcanized first-stage radial tire carcass; (b) expanding the first-stage radial tire carcass into a toroidal-like configuration; (c) assembling the first-stage radial tire carcass with a tread reinforcing structure, said tread reinforcing structure including at least two tread reinforcing plies and at least one circumferential wrap of substantially inextensible restrictor band material comprising restricting elements which are substantially parallel to each other such that said restricting elements form a substantially zero-degree orientation with respect to the mid-circumferential plane of said radial tire carcass, said restrictor band material thereby restricting expansion of the unvulcanized radial tire carcass beyond a predetermined outside diameter at its mid-circumferential plane; (d) applying tread material circumferentially about the radial tire carcass assembled in step (c) to form an unvulcanized radial tire; and (e) thereafter placing the unvulcanized radial tire into a curing mold, having a tread ring with an inside diameter sufficient to receive said unvulcanized tire, and applying heat and pressure to vulcanize said radial tire.

There is provided in accordance with another aspect of the invention a method of manufacturing a radial tire comprising the steps of: (a) providing an unvulcanized first-stage radial tire carcass; (b) providing a pre-assembled tread reinforcing structure that is attached by means for attachment to an inner circumferential surface of an annular ring, said tread reinforcing structure including at least two tread reinforcing plies and at least one circumferential wrap of substantially inextensible restrictor band material, said restrictor band material comprising restricting elements which are substantially parallel to each other such that said restricting elements form a substantially zero-degree orientation with respect to the mid-circumferential plane of said radial tire carcass, said restrictor band material thereby preventing expansion of the unvulcanized radial tire carcass beyond a predetermined outside diameter at its mid-circumferential plane; (c) mounting said first-stage radial tire carcass on a bladder assembly and introducing only enough pressure exerting fluid into said bladder assembly as is necessary to maintain said tire carcass in a fixed relationship with said bladder assembly; (d) inserting said bladder assembly, with said tire carcass mounted thereon, into said annular ring such that said pre-assembled tread reinforcing structure is axially centered with respect to said first-stage radial tire carcass, increasing the inflation pressure in said bladder assembly such that said first-stage radial tire carcass expands into a toroidal-like shape and becomes firmly adhered to said tread reinforcing structure; (e) removing said annular ring from around said tread reinforcing structure leaving said tread reinforcing structure assembled with said radial tire carcass; (f) applying tread material circumferentially about the unvulcanized radial tire carcass manufactured in step (e) to form an unvulcanized radial tire, and thereafter maintaining an internal inflation pressure in said bladder assembly that is sufficient to at least maintain said tire in a fixed relationship with said bladder assembly; and (g) thereafter placing the unvulcanized radial tire into a curing mold, having a tread ring with an inside diameter sufficient to receive said unvulcanized tire, and applying heat and pressure to vulcanize said radial tire.

BRIEF DESCRIPTION OF THE DRAWINGS

To acquaint persons skilled in the tire manufacturing and design technologies more fully with the invention, the preferred embodiment of the invention is described below with reference to the drawings in which.

DETAILED DESCRIPTION OF THE INVENTION

Figure 1:
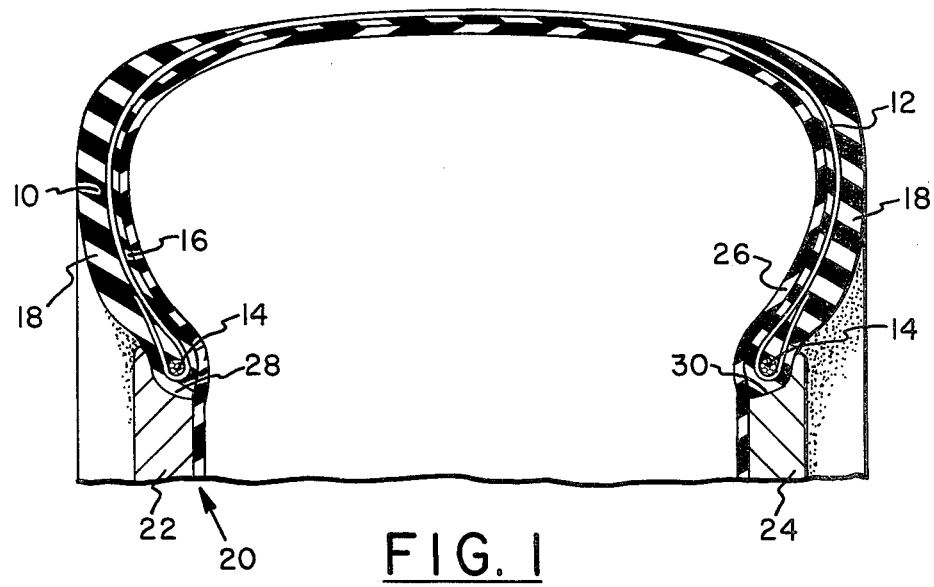
FIG. 1 is a radial cross-section of an unvulcanized first-stage radial tire carcass expanded into a toroidal-like configuration.

The first step in manufacturing a radial tire in accordance with the present invention is to provide an unvulcanized first-stage radial tire carcass such as that shown in FIG. 1. A first-stage radial tire carcass 10 comprises at least one ply 12 of radially oriented carcass reinforcing elements, such as cords, wires, or cables, anchored around substantially inextensible beads 14. A first-stage radial tire carcass may further comprise, at the discretion of a tire designer, an air impervious innerliner 16 and sidewall material 18. Methods of assembling a first-stage radial tire are well known in the tire manufacturing technology.

FIG. 1 is a radial cross-sectional view of an unvulcanized first-stage radial tire carcass 10 that has been expanded from the generally hollow cylindrical shape in which it was assembled, in accordance with methods and techniques that are well known in the tire manufacturing technology, into a toroidal-like configuration. The first-stage radial tire carcass is mounted upon a bladder assembly 20 comprising disc-shaped end plates 22,24 and a bladder 26 made of an elastomeric material, and remains mounted on the bladder assembly throughout the remaining steps of the manufacturing process. The disc-shaped plates have a means for introducing a pressure exerting fluid into the bladder assembly (not shown), and are adapted around their circumferences 28,30 to receive the bead of the radial carcass. When inflation pressure in the form of a pressure exerting fluid, such as air, is introduced into the bladder assembly 20, in an amount sufficient to generate a low inflation pressure in the range of about 3 to 15 p.s.i., (20,670 to 103,350 Pascales), to maintain the tire carcass in a fixed relationship with the bladder assembly, the first stage radial tire carcass 10 attempts to assume its natural shape.

Figure 2:
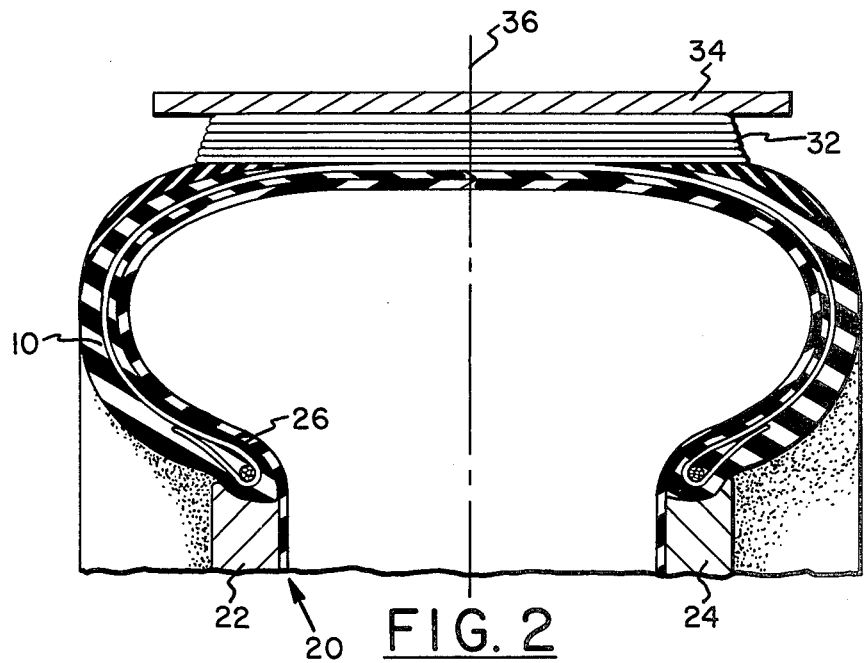
FIG. 2 is a radial cross-section of the unvulcanized first-stage radial tire carcass of FIG. 1 after it has been further expanded and brought into contact with a pre-assembled tread reinforcing structure.

FIG. 2 is a radial cross-sectional view of the unvulcanized radial tire carcass 10 of FIG. 1, after it has been further expanded to bring it into contact with a pre-assembled tread reinforcing structure 32 that has been provided. The pre-assembled tread reinforcing structure 32 is shown attached by means for attachment, such as a vacuum or magnetic means (if the tread reinforcing structure has reinforcing elements of a ferrous composition), to the inner circumferential surface of an annular ring 34. The tread reinforcing structure comprises at least two tread reinforcing plies, sometimes referred to in the tire technology as belts, of the type that is well known in the tire technology. The tread reinforcing structure also comprises at least one circumferential wrap of restrictor band material (not shown). For best results, the circumferential ends of the restrictor band material should be overlapped rather than butt-spliced. The restrictor band material comprises restricting elements, such as cords or cables, which allow slippage and/or stretching to occur without breaking to restrict the radial growth of a radial tire carcass or radial tire at the bladder inflation pressure required to stabilize the carcass or tire, between the time that the tread reinforcing structure is installed about the first-stage radial tire carcass and the placing of the radial tire into a mold for vulcanization. The restricting elements are substantially parallel to each other and may be embedded in an elastomeric substance. The restricting elements form a substantially zero-degree orientation, with respect to the mid-circumferential plane 36 of the radial tire carcass 10. The restrictor band thereby prevents expansion, at low bladder inflation pressure, of the unvulcanized tire or carcass beyond a predetermined outside diameter at its mid-circumferential plane. The predetermined outside diameter must be less than or equal to the inside diameter of the tread ring of a mold in which the tire is to be vulcanized. By "substantially zero-degrees", it is meant that the restricting elements in the restrictor band should form an angle of between about zero degrees and about four degrees relative to the mid-circumferential plane 36 of the radial tire carcass 10. It is preferred that for best results, the axial width of the restrictor band material should be substantially the same as the axial width of the widest tread reinforcing ply. The restricting elements may be cords or cables of any suitable material having slippage and/or elongation properties that co-operate with a sufficiently high tensile strength to restrict, but not totally prevent the expansion of an unvulcanized radial tire or carcass.

Large tires, size 42–50, manufactured in accordance with the present invention using restrictor band material having restricting elements that were cords of 840/2 denier nylon, spaced between 10 and 22 reinforcing cords per inch, (39 to 86 reinforcing cords per decimeter), of axial width were quite satisfactory. By 840/2 denier nylon is meant a nylon cord weighing 840 grams per 9,000 meters of length, having two intertwined filaments, an overall gauge of about 0.022 inches (0.56 mm), and a tensile strength of about 32 pounds per cord (142 Newtons per cord). However, any suitable material selected in accordance with good engineering practices may be used for the restricting elements, such as other deniers of nylon. The restricting elements should not be a substantially inextensible material though, because some expansion of the tire during the vulcanization process may be necessary. In selecting the restricting element material to be used in a particular application the tire engineer should take into account the slippage and/or elongation properties of the material with respect to other design parameters. In other words, it is preferable that slippage and/or stretching of the reinforcing elements occur rather than breakage.

In practicing the preferred embodiment of the present invention, the pre-assembled tread reinforcing structure 32 is assembled such that the restrictor band material is located radially outward, with respect to the tire carcass, of all the tread reinforcing plies such that the restrictor band material is interposed between the tread reinforcing plies and the tread material of the completed radial tire. In other words, in the preferred embodiment, the restrictor band material is radially outward of all the tread reinforcing plies. One alternate embodiment for practicing the present invention is to have the pre-assembled tread reinforcing structure 32 assembled such that the restrictor band material is located radially inward, with respect to the tire carcass, of all the tread reinforcing plies, such that the restrictor band is interposed between the first-stage radial tire carcass and all the tread reinforcing plies. Yet another alternative is that the pre-assembled tread reinforcing structure have the restrictor band material interposed between the tread reinforcing plies.

After providing a pre-assembled tread reinforcing structure 32, as described above, the bladder assembly 20 with the tire carcass 10 mounted thereon, is inserted into the annular ring 34 such that the annular ring is axially centered with respect to the tire carcass. The inflation pressure in the bladder assembly is then increased such that the radial tire carcass expands into a toroidal-like shape and becomes firmly adhered to the reinforcing structure. The annular ring is then removed from around the tread reinforcing structure, leaving the tread reinforcing structure installed around the unvulcanized radial tire carcass. Tread material 39 is then applied circumferentially about the unvulcanized radial tire carcass to form an unvulcanized, but completely assembled, radial tire, and thereafter there is maintained an internal inflation pressure in the bladder assembly that is sufficient at least to maintain the radial tire in a fixed relationship with the bladder assembly.

While the preferred method of practicing the present invention involves removing the unvulcanized first-stage radial tire carcass 10 from the tire building drum on which it has been assembled, then assembling a pre-assembled tread reinforcing structure 32 with it, the invention may also be practiced by simply expanding the first-stage radial tire carcass into a toroidal-like configuration, by any means for expansion, and then assembling each separate component of a tread reinforcing structure around the outer circumferential surface of the first-stage radial tire carcass. In this alternative embodiment of the invention, the tread reinforcing structure includes at least two tread reinforcing plies and at least one circumferential wrap of restrictor band material having the same structure, after they have been assembled around the first-stage radial tire carcass, as the pre-assembled tread reinforcing structure 32 described above. The radial ply carcass then has tread material applied circumferentially about it to form an unvulcanized radial tire.

Figure 3:
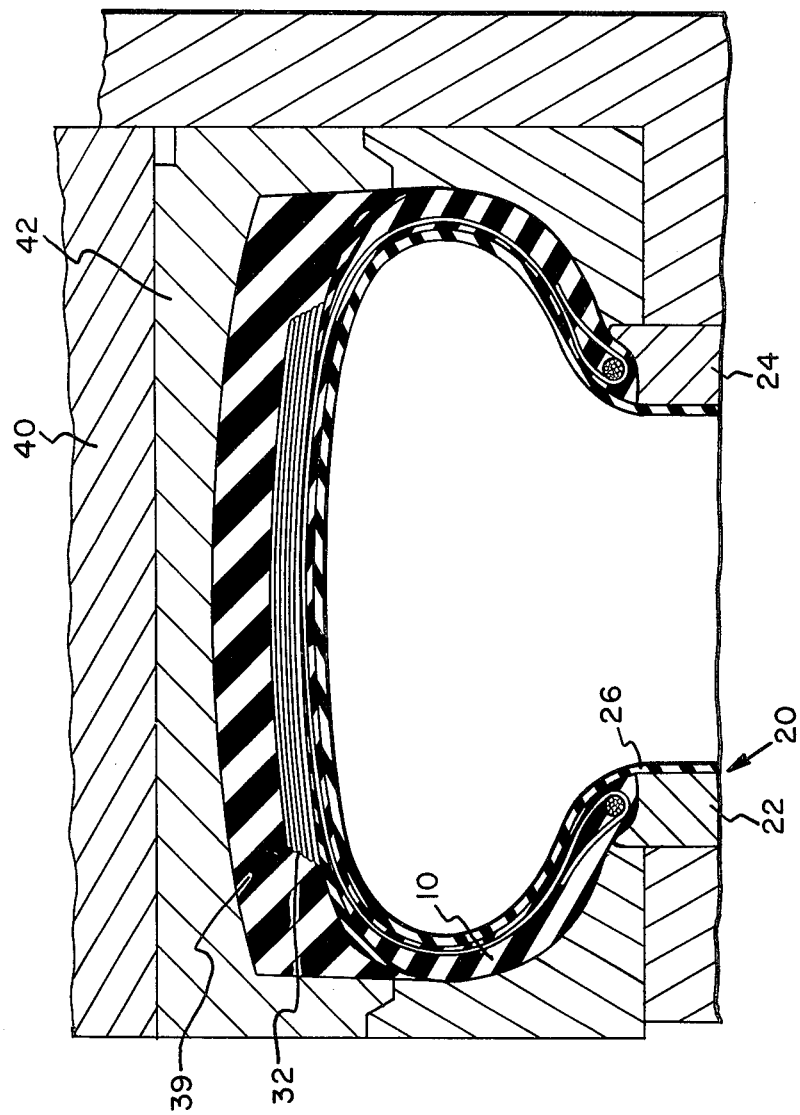
FIG. 3 is a radial cross-sectional view of the radial tire carcass of FIG. 2 after it has been assembled with a tread portion to form a radial tire, and been placed in a mold for vulcanization.

Referring now to FIG. 3, which is a radial cross-sectional view of an unvulcanized radial tire that has been manufactured or assembled as described herein, after it has been placed into a curing mold 40. The curing mold has a tread ring 42 with an inside diameter sufficient to receive the unvulcanized radial tire manufactured in accordance with the present invention. A sufficient amount of pressure exerting fluid, usually steam, is introduced into the bladder assembly 20 to apply pressure to force the tire against the inside of the mold and tread ring, while pressure exerting fluid inside the bladder and other means of heating the tire, that are well known in the tire manufacturing technology, are used to provide heat and pressure to vulcanize the radial tire. It should be readily apparent to one skilled in the tire manufacturing and design technologies that if an unvulcanized radial tire is stored mounted upon a bladder assembly, even though the bladder assembly has a minimal amount of inflation pressure therein, and the unvulcanized radial tire is allowed to expand unrestricted in an attempt to assume its natural shape, it may attain an outside diameter at its mid-circumferential plane that is larger than the inside diameter of the tread ring of the mold. By manufacturing low aspect ratio radial earthmover tires, in sizes ranging from about 1800-25 to 3600-51, in accordance with this invention, the problem of oversize unvulcanized tires may be avoided. However, the method of the present invention may also be used in the manufacturing of smaller sizes of ties, and similar articles, where the restriction of the growth of the tire or similar article in a radial direction before vulcanization is important.

While certain representative embodiments and details have been shown for the purpose of illustrating the invention, it will be apparent to those skilled in the art that various changes and modifications may be made therein without departing from the spirit or scope of the invention.

What is claimed is:

1. A method of manufacturing a low aspect ratio radial earthmover tire, comprising the steps of:
   (a) providing an unvulcanized first-stage radial tire carcass;
   (b) providing a pre-assembled tread reinforcing structure that is attached by means for attachment to an inner circumferential surface of an annular ring, said tread reinforcing structure comprising at least two tread reinforcing plies and at least one circumferential wrap of substantially inextensible restrictor band material located radially outwardly of said tread reinforcing plies, said restrictor band material comprising nylon cords which are substantially parallel to each other and have a substantially zero-degree orientation with respect to the mid-circumferential plane of said radial tire carcass, said restrictor band material thereby preventing expansion of the unvulcanized radial tire carcass beyond a predetermined outside diameter at its mid-circumferential plane;

(c) mounting said first-stage radial tire carcass on a bladder assembly and introducing inflation pressure into said bladder assembly to maintain said tire carcass in a fixed relationship with said bladder assembly;

(d) inserting said bladder assembly, with said tire carcass mounted thereon, into said annular ring such that said pre-assembled tread reinforcing structure is axially centered with respect to said first-stage radial tire carcass, then increasing the inflation pressure in said bladder assembly such that said first-stage radial tire carcass expands into a toroidal-like shape and becomes adhered to said tread reinforcing structure;

(e) removing said annular ring from around said tread reinforcing structure, leaving said tread reinforcing structure assembled with said radial tire carcass;

(f) applying tread material circumferentially about the unvulcanized radial tire carcass manufactured in step (e) to form an unvulcanized radial tire, and continuing to maintain an internal inflation pressure in said bladder assembly; and (g) placing the unvulcanized radial tire and bladder assembly into a curing mold having a tread ring with an inside diameter sufficient to receive said unvulcanized tire, and vulcanizing said tire.

* * * * *